United States Patent

[11] 3,569,622

[72] Inventor Carl M. Mengani
Brooklyn, N.Y.

[21] Appl. No. 377,698
[22] Filed June 24, 1964
[45] Patented Mar. 9, 1971
[73] Assignee Burroughs Corporation
Detroit, Mich.

[54] SIGNALLING CIRCUIT FOR INDICATING THE PRESENCE OF INFORMATION
4 Claims, 3 Drawing Figs.

[52] U.S. Cl. .......... 178/7.7, 340/146.3
[51] Int. Cl. .......... G06k 9/00
[50] Field of Search .......... 340/146.3 (Inquired); 178/7.6, 53, 53.1 (Cursory); 328/27, 34, 156; 178/7.5 (S), 7.7

[56] References Cited

UNITED STATES PATENTS

| | | | |
|---|---|---|---|
| 3,293,604 | 12/1966 | Klein | 340/146.3 |
| 3,187,306 | 6/1965 | Rabinow | 340/146.3 |
| 3,193,799 | 6/1965 | Holt | 340/146.3 |
| 3,274,550 | 9/1966 | Klein | 340/146.3 |
| 3,213,422 | 10/1965 | Fritze | 340/146.3 |
| 3,240,872 | 3/1966 | Relis | 340/146.3 |

*Primary Examiner*—Robert L. Griffin
*Assistant Examiner*—Joseph L. Orsini, Jr.
*Attorney*—Kenneth L. Miller

ABSTRACT: A signalling circuit for indicating the beginning and end of symbol information in a character recognition system including a flip-flop which is set by the presence of the symbol information signals to provide an output control signal and is reset by the first retrace signal in the system after the information signals have terminated. This output signal indicates the time during which symbol information is present in the system and may be differentiated to provide start-of-character signals and end-of-character signals in the system.

INVENTOR.
CARL M. MENGANI
BY Vincent L. Carney
ATTORNEY

INVENTOR.
CARL M. MENGANI

BY Vincent L. Carney
ATTORNEY

SIGNALLING CIRCUIT FOR INDICATING THE PRESENCE OF INFORMATION

This invention relates to signalling circuits and more particularly relates to a circuit for detecting the start and end of video information in a signal channel and for indicating the start and end of this video information.

In certain types of scanning systems, the scan is of a repetitive nature. Each cycle of the scan is characterized by a trace or sweep segment, and a retrace segment. The information obtained in scanning is contained in the output of the scanning sensor during the trace segment; the retrace is for the purpose of returning the scanning element back from the end of one trace to the beginning of the next. The output of the scanning sensor during retrace is generally blanked or inhibited somewhere in the information processing system. Each trace or sweep is usually displaced in some way from the preceding one.

In some character recognition systems, for example, a document is moved in one direction (horizontal, for example) while a light beam sweeps across the document in the opposite direction (vertical). Reflections from the light beam are sensed by an optical sensing circuit to obtain video information. Such a system is described in the article entitled "A Typed-page Reader" by Leon J. Mintz and Kenneth R. Brooks in the book "Optical Character Recognition," edited by Fischer, Pollock, Radack and Stevens, published by Spartan Books, 1962, pages 85—92.

In such character recognition device, video information concerning the character is sensed in a series of scans across the character, each scan being displaced from the preceding one by document motion. A portion of the video information lies in each of a group of succeeding scans, and no portion lies outside of such a group. Such a group has a first scan and a last scan, temporally. It is often desired to know the first scan (start-of-character) and the last scan (end-of-character) of the group. This information, for example, may control the operation of a memory so as to determine the length of its readout.

An endof-character signal may be obtained through the use of a peak detector which charges a capacitor to the peak of the black video signal encountered in each sweep. If the discharging time constant is made relative long, compared with the duration of the sweep, then the capacitor discharges more in a sweep in which no black video signal is encountered than a sweep containing a black video signal. If two sweeps are encountered in succession which contain no black video, the capacitor discharges even further. An amplitude discriminator such as a Schmitt trigger, may be used to determined that the capacitor has discharged to a level lower than the level to which it can possibly discharge in a sweep containing black video. Therefore, the triggering of the Schmitt trigger occurs in the first sweep not containing black video, which must be the first sweep following the last sweep of a character.

Apparatus operating in the aforementioned mode depends on a critical adjustment of the time-constant determining components. The circuit also depends on the peak amplitude of the black video signal and is therefore amplitude sensitive. Accordingly, it is an object of this invention to provide an improved signalling device for generating beginning-of-character signals and end-of-character signals.

It is a further object of this invention to provide a system for signalling the beginning of video information and the end of video information temporally in a signal channel, which system is not excessively amplitude sensitive.

It is a still further object of the invention to provide end-of-character signals without the necessity of critical adjustment of time-constant determining components.

In accordance with the above objects a flip-flop is provided which flip-flop is set by the presence of video signals to provide an output and is reset by the first sweep of the scanner after the video information for that group has ceased. This flip-flop provides an output signal which indicates the time in which a video signal is present in the channel. This output pulse may be differentiated to obtain start-of-character signals and end-of-character signals.

The system for resetting the flip-flop uses both the black video information due to the scanning of dark areas and the blacker-than-black voltage pulses which are present on the same channel due to the blanking of the scanner during retrace. The black video pulses combined with the blacker-than-black pulses are used to reset a control-reset flip-flop. A channel which has the unblanking pulses in it is first differentiated and then applied to the set input of the reset-control flip-flop. If there is no video information in the channel, the blacker-than-black pulses reset the reset-control flip-flop and the differentiated unblanking pulses immediately set the flip-flop so that it remains in the set condition. However, if video information is present, the blacker-than-black pulses in the video channel reset the flip-flop, the differentiated unblanking signal sets the flip-flop and then the video information again resets the flip-flop. This means that if there is no video information the flip-flop is set and provides an output voltage, but if there is video information the flip-flop remains reset and does not provide an output voltage. The output voltage is applied to one input of a two-input AND gate. An inverted unblinking pulse is applied to the other input to the AND gate. If there is no video signal in the input channel, the AND gate passes the inverted unblanking pulses to the output flip-flop These pulses reset the output flip-flop so as to provide the end-of-character signal. A delay is inserted between the reset-control flip-flop and the AND gate to prevent accidental switching when one input to the gate is rising and the other is falling.

The above-noted and other features of the invention will be understood more fully and clearly from the following detailed description considered with reference to the accompanying drawings in which.

Figure 1:
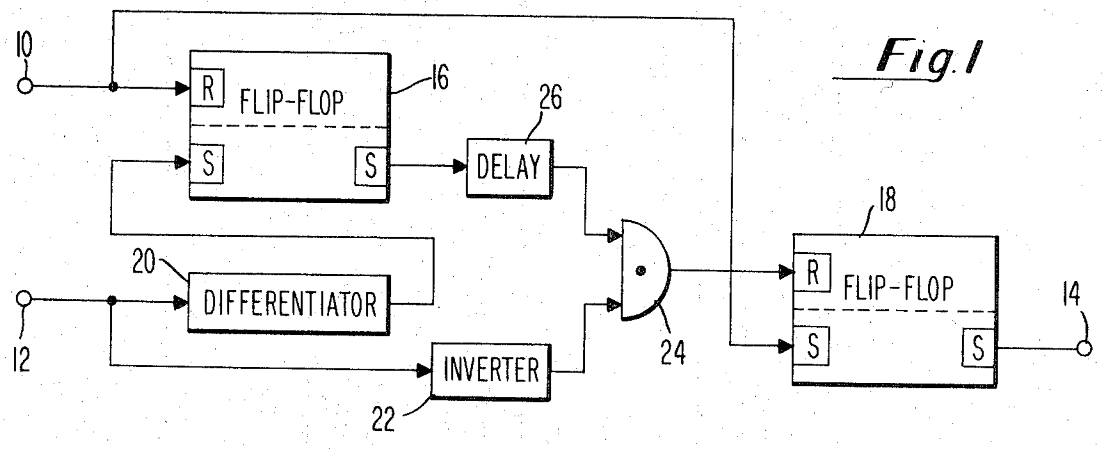
FIG. 1 is a block diagram of an embodiment of the invention.

In FIG. 1 a block diagram of an embodiment of the invention is shown in which input black video signals together with blacker-than-black pulses for the scanner tube are applied to input terminal 10 and in which unblanking voltages for the scanner tube are applied to input terminal 12. The video signals are obtained from the scanning of a character on a document. They are sometimes called "black pulses." An output terminal 14 provides a positive output voltage starting with the first video signal in a group of scans having video information and ending on the start of the first blanking pulse after a sweep having no information.

The terminal 10 is electrically connected to the reset input terminal of the reset-control flip-flop 16 and to the set input terminal of the output flip-flop 18. The terminal 12 is electrically connected to the input of the differentiator 20 and to the input of an inverter 22. The output of the differentiator 20 is electrically connected to the set input terminal of the flip-flop 16; the output of the inverter 22 is electrically connected to one of the two inputs of the AND gate 24. The output terminal of the flip-flop 16 is electrically connected to the other input of the AND gate 24, through the delay 26. The output of the AND gate 24 is electrically connected to the reset input of the flip-flop 18.

When there is no video signal in the input channel, the flip-flop 18 is in the reset condition and the flip-flop 16 is in the set condition. The blacker-than-black pulses which are applied to the video channel 10 do not cause the flip-flop 16 to remain reset because the unblanking pulses applied to terminal 12 are differentiated and cause the flip-flop 16 to be set immediately. The positive output from the flip-flop 16 enables the AND gate 24 which then passes the inverted unblanking pulses from the inverter 22 to the reset terminal of the output flip-flop 18. However, these pulses have no effect on the output flip-flop 18 since it is already reset. It remains in this state while the sweep encounters no character.

However, when a character is encountered by the sweep, black video signals appear on terminal 10 between the positive blacker-than-black pulses. Now, the output flip-flop is set and provides an output pulse and the flip-flop 16 is reset. While the flip-flop 16 is in its reset condition due to the presence of a black video signal, the AND gate 24 is disabled and does not provide an output to the reset terminal. This means the output flip-flop 18 remains in the set condition instead of being reset by an output pulse from the AND gate 24. This causes a positive output voltage to appear at the output terminal 14 indicating a start-of-character signal.

When the character has been carried past the scanner tube so that it is no longer scanned by the sweep, the flip-flop 16 is no longer reset after the unblanking pulse sets it. This causes the AND gate 24 to be enabled to pass the unblanking pulses to the reset terminal of the output flip-flop 18. This turns off the output pulse at terminal 14 indicating an end-of-character signal. It can be seen that at every succeeding consecutive sweep containing black video, no output appears at the AND gate 24 during retrace, but in every other sweep an output does appear. The output flip-flop 18 is reset during retrace following the first sweep indicating no black video, and is set by the first succeeding sweep containing black video. Therefore, the output waveform of the flip-flop 18 switches in one direction when the first black video of an object is encountered, and switches in the other direction during retrace of the first sweep following the last sweep containing black video. It can switch at no other time. The changes in state of the output waveform therefore indicate as precisely as possible, the start and the end of the scanning of an object.

The delay 26 prevents short pulses from passing through the AND gate when not desired due to the indeterminate pulse combinations at times when one of the inputs to the AND gate 24 is rising and the other is falling.

Figure 2:
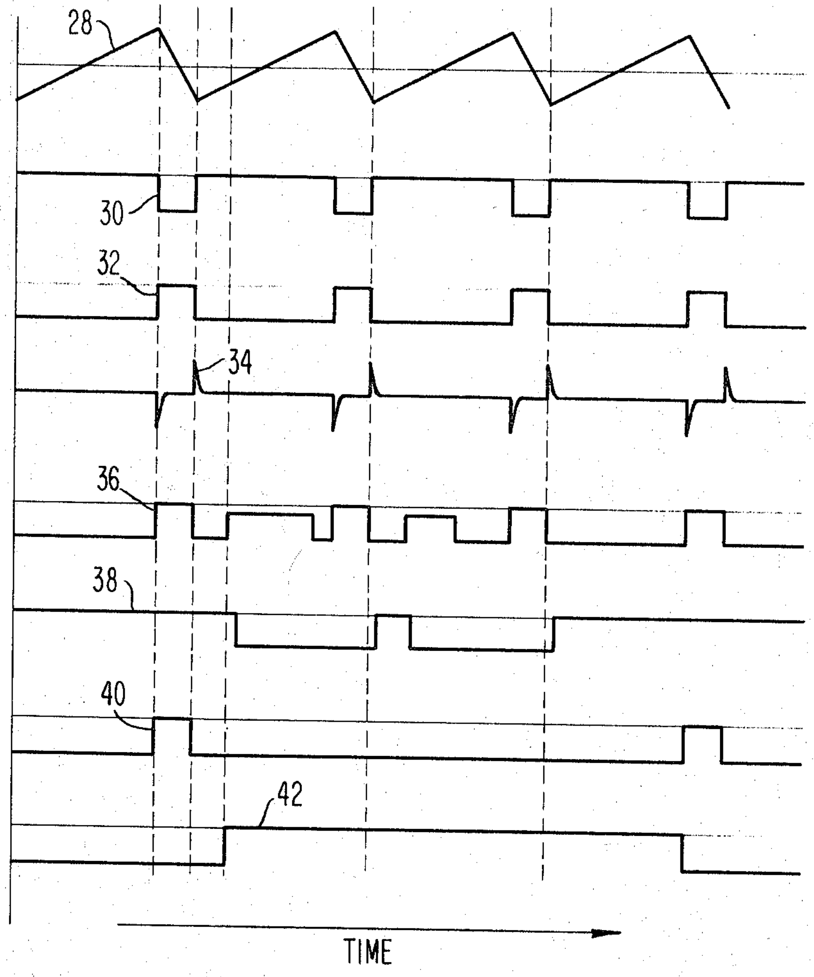
FIG. 2 is a graph having eight curves, one under the other with common abscissas of time and each having an individual ordinate of voltage occuring at a different point in the circuit of FIG. 1.

In FIG. 2 a graph is shown having eight curves each representing the voltage at different points in the circuit of FIG. 1, having individual ordinates of voltage and common abscissas of time. The curve 28 shows a sawtooth waveform which generates each sweep of the scan. The curve 30 shows the unblanking waveform generated by the sweep generator. These voltage pulses are used by a gate circuit to inhibit or to blank the video signal during retrace. They are applied to the terminal 12 in FIG. 1.

The curve 32 represents inverted unblanking pulses. These are the pulses that appear at the output of the inverter 22. They are applied through the AND gate 24 to the reset of the flip-flop 18 when there are no video signals in the signal channel to reset the flip-flop 16.

The curve 34 represents differentiated unblanking pulses which appear at the output of the differentiator 20. The positive spike of this curve sets the flip-flop 16 so that the flip-flop 16 will remain in its reset condition during a sweep only if there is a video signal and not merely because of the blacker-than-black pulses appear on the same channel. The differentiating pulses 34 remove the effect of the blacker-than-black pulses by setting the flip-flop 16 after it has been reset by the blacker-than-black pulses.

The curve 36 represents the signal appearing in the video channel: the pulses of greater amplitude being blacker-than-black pulses and the waveforms of smaller amplitude being video signals, (black pulses). The curve 38 represents the voltage waveform at the input to the AND gate 24 from the reset-control flip-flop 16. It will be noted that this voltage drops to a negative value shortly after video information appears at the input flip-flop 16. The delay is due to the delay line 16 which is inserted so that the next inverted unblanking pulse from the inverter 22 will be over before the ground level pulse from the flip-flop 16 occurs after flip-flop 16 is set by the unblanking pulse 30. This delay prevents a spurious switching at that time and insures against the gate 24 passing an undesirable voltage pulse.

The curve 40 represents the output from the AND gate 24 which occurs prior to the presence of video information in the signal and one sweep after the last video signal in the information channel. The curve 42 shows the ground level voltage which occurs at the output terminal 14 in FIG. 1 between the time that a video signal occurs and the time of a blanking pulse one sweep after the last video signal in the group.

Figure 3:
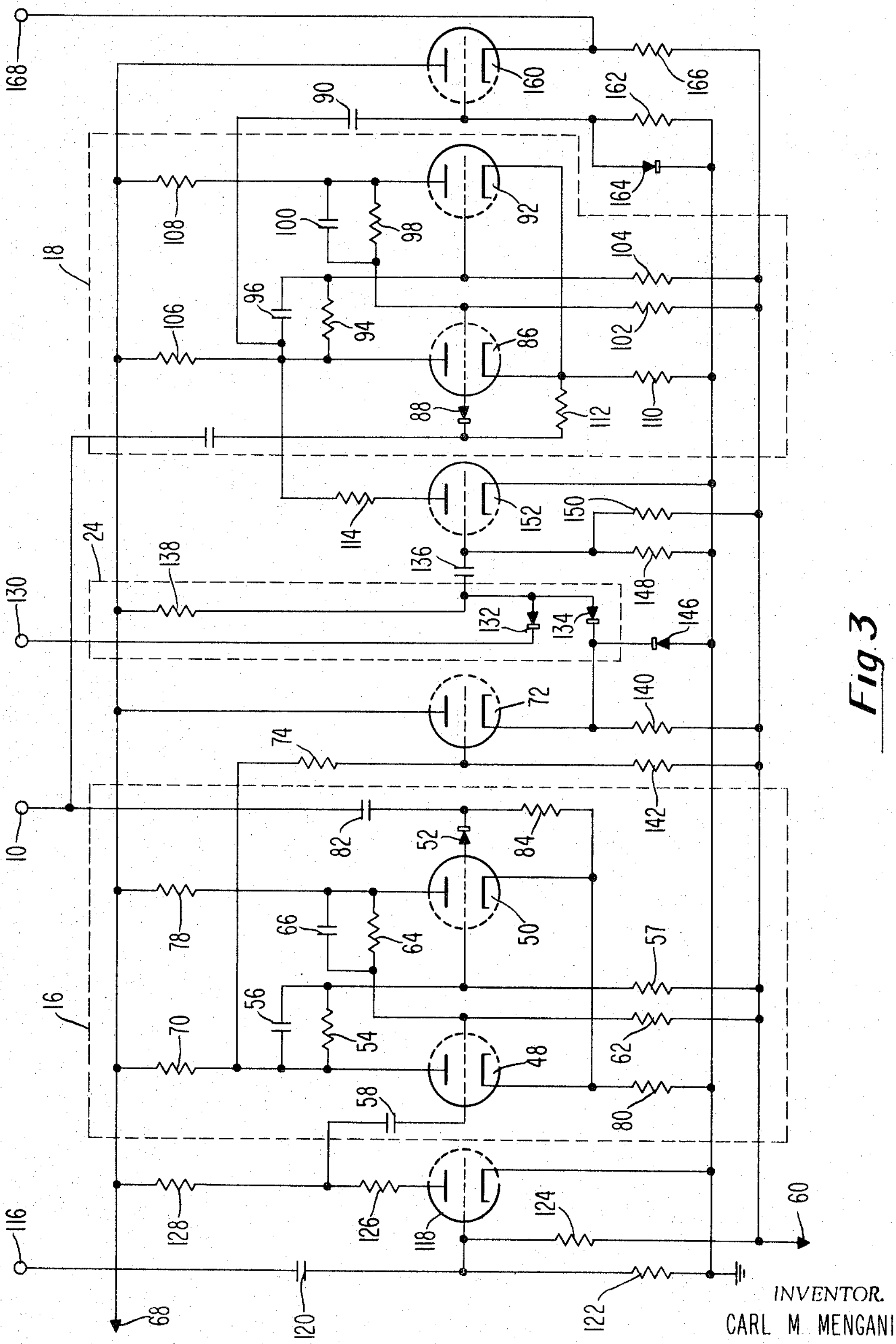
FIG. 3 is a schematic circuit diagram of the invention.

In FIG. 3 a schematic circuit diagram of an embodiment of the invention is shown in which all of the vacuum tubes are of the type 5965 and all of the diodes are of the type 1N116. The input terminal 10 which receives the video signal is electrically connected to the flip-flop 16 and to the flip-flop 18. The flip-flop 16 includes triodes 48 and 50.

The grid of the triode vacuum tube 50 is electrically connected to the anode of the diode 52, the plate of the triode vacuum tube 48 to the parallel crossover circuit having the 270K (kilohm) resistor 54 and a commutating 50 micromicrofarad capacitor 56 in parallel; the grid of the vacuum tube triode 48 is electrically connected to a first plate of the 15 microfarad capacitor 58, to a source of a negative 150 volts 60 through a 470K resistor 62 and to the plate of the vacuum tube triode 50 through the crossover circuit including the parallel 270K resistor 64 and to the 50 micromicrofarad capacitor 66.

The plate of the triode 48 is electrically connected to a positive source of 150 volts 68 through the 27K resistor 70 and to the grid of the triode vacuum tube 72 through the 270K resistor 74; the plate of the vacuum tube 50 is electrically connected to the source of a positive 150 volts 68 through a 27K resistor 78. The cathode of the vacuum tube triode 48 is grounded through a 1K resistor 80, is electrically connected to the cathode of the triode 50, and to the cathode of the diode 52; the cathode of the triode 50 is electrically connected to the cathode of capacitor 82 through the 10K resistor 84. The other plate of the capacitor diode 52 and to one plate of the 100 micromicrofarad capacitor 82 through the 10K resistor 84. The other plate of the capacitor 82 is electrically connected to the input terminal 10.

The output flip-flop indicated generally at 18 has the same construction and parameters as the reset-control flip-flop indicated generally at 16, but the input terminal 10 is electrically connected to the grid of a vacuum tube 86 through a diode 88 in the same manner as it is electrically connected to the vacuum tube 50 through the diode 52 in the flip-flop 16, and the plate of the vacuum tube 86 is electrically connected to one plate of the 20 micromicrofarad capacitor 90 in the same manner that the plate of the vacuum tube 48 is electrically connected to one end of the resistor 74 in the flip-flop 16.

The crossover network from the plate of vacuum tube 86 to the grid of the vacuum tube 92 includes the resistor 94 and the capacitor 96 and the crossover network from the plate of the vacuum tube 92 to the grid of the vacuum tube 86 includes the resistor 98 in the capacitor 100. Also, the vacuum tubes 86 and 92 have their grids electrically connected to the source of a negative 150 volts through their resistors 102 and 104 respectively, having their plates electrically connected to the source of a positive 150 volts 68 through the resistors 106 and 108 respectively and have their cathodes grounded through the resistor 110 and electrically connected to the input diode 88 through the resistor 112. The plate of the vacuum tube 86 is also electrically connected to the one end of the 27K resistor 114.

Input video signals to the terminal 10 reset the flip-flop 16 by cutting off the vacuum tube 50 and turning on the vacuum tube 48 and set the flip-flop 18 by turning off the vacuum tube 86 and turning on the vacuum tube 92. The input diodes block the positive excursions of the differentiated input so as to turn off their respective vacuum tubes on the trailing edge. The flip-flop 16 is set by a negative pulse coupled through capacitor 58 which turns off the vacuum tube 48 and turns on the vacuum tube 50. This causes a positive output voltage to be applied to the resistor 74. Flip-flop 18 is reset by a negative going voltage tube 92 and turns on the vacuum tube 86. When flip-flop 18 is set by the voltage pulse on terminal 10 it provides a positive output voltage to the coupling capacitor 90. The inherent switching delay of the flip-flop 16 completely eliminates eliminates the need for a separate delay line such as that indicated at 26 in FIG. 1.

The differentiated unblanking pulses are applied to a terminal 116. This terminal activates the triggering amplifier which applies negative voltage pulses to capacitor 58 to cut off vacuum tube 48 setting the flip-flop 16. The terminal 116 is coupled to the grid of a vacuum tube 118 through the 0.01 microfarad capacitor 120. The grid of the vacuum tube 118 is also electrically connected to ground through 330K resistor 122 and is coupled to the source of a negative 150 volts through the 2.2M (mega-ohm) resistor 124. Its cathode is grounded and its plate is electrically connected to one plate of a coupling capacitor 58 through a 18K resistor 126; the source of a positive 150 volts 68 is electrically connected to the capacitor 58 and the resistor 126 to a 10K resistor 128.

The terminal 130 receives the inverted differentiated trailing edge of the unblanking pulse, usable in place of the inverted blanking pulse itself, and is electrically connected to the AND gate indicated generally as 24. The AND gate 24 includes the diode 132 and the diode 134 each of which have their anode electrically connected to one plate of the 0.25 microfarad coupling capacitor 136 and to the source of a positive 150 volts 68 through the 120K resistor 138. 146 cathode of the diode 132 is electrically connected to the terminal 130. The cathode of the diode 134 is electrically connected to the cathode of the vacuum tube triode 72 and to the source of a negative 150 volts 60 through the 33K resistor 140.

The vacuum tube 72 has its grid electrically connected to the other end of the resistor 74 and to a source of a negative 150 volts 60 through the 680K resistor 142 and has its plate electrically connected to the source of a positive 150 volts 68. The vacuum 72 is connected as a cathode follower to receive the output from the set terminal of the flip-flop 16 and to drive the AND gate 24 through the diode 134. A diode 146 has its anode connected to ground and its cathode electrically connected to the cathode of the diode 134 to prevent it from negative excursions. When the diode 132 receives a positive input on terminal 130 and the diode 134 receives a positive input from the flip-flop it provides a positive output to the coupling capacitor 136.

The other plate of the coupling capacitor 136 is electrically connected to ground through a 330K resistor 148 and to the source of a negative 150 volts 60 through the 2.2M resistor 150, and to the grid of the vacuum tube triode 152. The cathode of the vacuum tube triode 152 is grounded and its plate is electrically connected to the other end of the resistor 114. The vacuum tube 150 forms a triggering amplifier which couples the output from the AND gate 24 to reset input of the output flip-flop 18.

The flip-flop 18 provides a start-of-character signal and the end-of-character signal to a differentiator and a cathode follower. The other plate of the capacitor 90 is electrically connected to the grid of the triode vacuum tube 160, and to one end of the 100K resistor 162 and the anode of the diode 164; the other end of the resistor 162 and the cathode of the diode 164 are grounded. The plate of the vacuum tube 160 is electrically connected to the source of positive 150 volts 68 and the cathode is electrically connected to the source of a negative 150 volts 60 through the 33K resistor 166. The start-of-character and end-of-character output terminal 168 is also electrically connected to the cathode of the vacuum tube triode 160. It provides the start-of-character and end-of-character signals from the follower amplifier 160 which receives them from the differentiator composed of the capacitor 90 and the resistor 162.

The above circuit provides start-of-character signals and end-of-character signals which are not sensitive to the amplitude of the black video signals applied to the input. There are no critical adjustments for time-constant determining components. The circuit is simple and economical and provides reliable operation.

Obviously, many modifications and variations of the invention are possible in the light of the above teachings. It is therefore to be understood that, within the scope of the appended claims, the invention may be practiced otherwise than as specifically described.

I claim:

1. The combination comprising:

a system input terminal adapted to receive black video information signals and blacker-than-black signals from a scanning system;

bistable means, having a first bistable-means input terminal and a second bistable-means input terminal and having a system output terminal, for providing a signal to said system output terminal between the time that a signal is received on said first bistable-means input terminal and the time that a signal is received on said second bistable-means input terminal;

said first bistable-means input terminal being electrically connected to said system input terminal;

control means, electrically connected to said second bistable-means input terminal, for applying a voltage to said second bistable-means input terminal whenever no black video information signal is received between consecutive blacker-than-black signals, whereby said system output terminal provides a signal indicating the time at which a video information signal appears at said system input terminal and the time that a full sweep is made by said scanning system with no video information signal appearing;

said control means comprising an AND gate having its output terminal electrically connected to said second bistable-means input terminal and having a first AND gate input terminal and a second AND gate input terminal;

first pulse generating means having an output electrically connected to said first AND gate input terminal for generating a voltage pulse between the termination of each of the unblanking signals of said scanning system and the start of video information on said system input terminal; and second pulse generating means, having its output electrically connected to said second AND gate input terminal for generating a voltage pulse in synchronism with said unblanking pulse of said scanning system, whereby said AND gate provides a voltage pulse to said second bistable means input terminal after any sweep of said scanning system in which there is no video information signal.

2. Apparatus for generating a start-of-character signal and an end-of-character signal for a character recognition device having a scanner comprising:

a first input terminal adapted to receive video signals and to receive retrace scanner signal;

a second input terminal adapted to receive scanner unblanking signals;

a signal output terminal adapted to provide said start-of-character signal and said end-of-character signal;

a first and second noncomplementing flip-flop;

a differentiator;

an inverter;

said first input terminal being electrically connected to the rest input of said first flip-flop and to the second input of said second flip-flop;

said second input terminal being electrically connected to the input of said differentiator and to the input of said inverter;

said signal output terminal being electrically connected to the output terminal of said second flip-flop;

the output of said differentiator being electrically connected to the set terminal of said first flip-flop; and a logical AND gate having an output terminal electrically connected to the first input of said second flip-flop and having two input terminals, one electrically connected to the output of said first flip-flop and the other being electrically connected to the output of said inverter.

3. Apparatus for providing a start-of-character signal and an end-of-character signal for a character recognition device having a scanner, comprising:

an input terminal to receive video signals and blanking signal from said scanner;

a second input terminal adapted to receive unblanking voltages from said scanner;

an output terminal adapted to provide start-of-character signals and said end-of-charater signals to a utility device;

said first and second noncomplementing flip-flops;

said first input terminal electrically connected to the reset input terminal of said first flip-flop and to the set input terminal of said second flip-flop;

said output terminal electrically connected to the output of said second flip-flop;

a differentiator;

an inverter;

said second input terminal being electrically connected to the input of said differentiator and to the input of said inverter;

the output terminal of said differentiator being electrically connected to the set terminal of said first flip-flop;

a delay line having its input electrically connected to the output of said first flip-flop;

a logical AND gate having one input electrically connected to the output of said delay line, and having a second input electrically connected to the output of said inverter, and having its output electrically connected to the reset terminal of said second flip-flop; and a differentiator having its input electrically connected to the output of said second flip-flop and having its output electrically connected to said output terminal.

4. A signalling circuit for providing end-of-character signals for a scanner, comprising:

a video pulse input terminal adapted to receive video information from said scanner;

a first flip-flop;

said first flip-flop being characterized by having two vacuum tube triodes with the grid of each electrically connected to the plate of the other through a capacitive crossover network and being biased to operate in the bistable mode;

said video pulse input terminal being electrically coupled to the grid of a first of said vacuum tube triodes of said first flip-flop;

a trace pulse input terminal adapted to receive differentiated unblanking signal;

first pulse amplifier means;

said trace pulse input terminal electrically connected to the input of said first pulse amplifying means;

the output of said first pulse amplifying means being electrically connected to the grid of the second of said vacuum tubes in said first flip-flop;

a first cathode follower;

the plate of said second of said vacuum tubes in said first flip-flop being electrically connected to the input of said first cathode follower;

a first diode having its cathode electrically connected to the output of said first cathode follower;

a retrace pulse input terminal adapted to receive inverted differentiated trailing edges of unblanking pulses;

a second diode having its cathode electrically connected to said retrace input terminal; unblanking a first resistor being electrically connected at one end to the anodes of said first and second diodes and being adapted to be connected to a source of positive voltage at its other end;

a second pulse amplifying means having its input electrically connected to the anodes of said first and second diodes;

a second flip-flop;

said second flip-flop being characterized by having a third and fourth vacuum tube having their plates and grids electrically coupled through crossover circuits and being biased so as to operate in the bistable mode;

said video pulse input terminal being electrically connected to the input of said third vacuum tube of said second flip-flop;

the output of said second pulse amplifier being electrically connected to the grid of said fourth vacuum tube through its crossover network;

a resistor-capacitor differentiator having its input electrically connected to the plate of said third vacuum tube;

an output terminal adapted to provide end-of-character signals; and a second cathode follower having its input electrically connected to said differentiator and having its output electrically connected to said output terminal.